United States Patent
Yoshikawa et al.

(10) Patent No.: US 10,482,910 B2
(45) Date of Patent: Nov. 19, 2019

(54) DISK DEVICE WITH MULTI-LAYER FLEXIBLE PRINTED WIRING BOARD MOUNTED TO ACTUATOR BLOCK

(71) Applicants: Kabushiki Kaisha Toshiba, Minato-ku, Tokyo (JP); Toshiba Electronic Devices & Storage Corporation, Minato-ku, Tokyo (JP)

(72) Inventors: Norio Yoshikawa, Yokohama Kanagawa (JP); Yoshihiro Amemiya, Chigasaki Kanagawa (JP)

(73) Assignees: Kabushiki Kaisha Toshiba, Tokyo (JP); Toshiba Electronic Devices & Storage Corporatoin, Tokyo (JP)

( * ) Notice: Subject to any disclaimer, the term of this patent is extended or adjusted under 35 U.S.C. 154(b) by 0 days.

(21) Appl. No.: 16/101,757

(22) Filed: Aug. 13, 2018

(65) Prior Publication Data
US 2019/0295600 A1    Sep. 26, 2019

(30) Foreign Application Priority Data

Mar. 22, 2018 (JP) ................. 2018-054927

(51) Int. Cl.
*G11B 5/48* (2006.01)
(52) U.S. Cl.
CPC .......... *G11B 5/4846* (2013.01); *G11B 5/4853* (2013.01)

(58) Field of Classification Search
None
See application file for complete search history.

(56) References Cited

U.S. PATENT DOCUMENTS

| 5,583,720 A | 12/1996 | Ishida et al. |
| 9,788,426 B2 | 10/2017 | Ishida et al. |
| 2002/0006717 A1* | 1/2002 | Yamaha .................. H01L 24/03 438/612 |
| 2004/0178492 A1* | 9/2004 | Tsukamoto et al. ......... H01L 23/49822 257/690 |
| 2018/0226330 A1* | 8/2018 | Kim et al. ........ H01L 23/49822 |

FOREIGN PATENT DOCUMENTS

JP    2642922 B2    8/1997

* cited by examiner

*Primary Examiner* — Craig A. Renner
(74) *Attorney, Agent, or Firm* — White & Case LLP (57) ABSTRACT

According to one embodiment, a flexible printed wiring board includes a base insulation layer, first wirings W1 on the base insulation layer, an intermediate insulation layer overlapped with the first wirings, connection pads on the intermediate insulation layer, a cover insulation layer overlapped with the connection pads and the intermediate insulation layer and including openings through which the connection pads are exposed to the cover layer, and conductive vias MT electrically connecting the first wirings to at least a part of the connection pads respectively. The conductive vias are overlapped with the connection pads in a thickness direction of the flexible printed wiring board.

9 Claims, 10 Drawing Sheets

DISK DEVICE WITH MULTI-LAYER FLEXIBLE PRINTED WIRING BOARD MOUNTED TO ACTUATOR BLOCK

CROSS-REFERENCE TO RELATED APPLICATIONS

This application is based upon and claims the benefit of priority from Japanese Patent Application No. 2018-054927, filed Mar. 22, 2018, the entire contents of which are incorporated herein by reference.

FIELD

Embodiments described herein relate generally to a flexible wiring board used in a disk device and a disk device provided with the same.

BACKGROUND

As a disk device, for example, a magnetic disk device generally includes a magnetic disk arranged in a base, a spindle motor configured to support and rotatably drive the magnetic disk, and a suspension assembly supporting a magnetic head. The suspension assembly includes a suspension attached to a distal end of an arm of an actuator assembly, a wiring member (flexure, wiring trace) provided on the suspension, and a load beam. The magnetic head is supported by a gimbal of the wiring member. A plurality of connection terminals are provided at a connection end of the wiring member. The connection end is solder bonded to connection pads of a flexible printed wiring board (FPC) provided in the actuator assembly.

The wiring member includes signal lines connected to a reading element and a writing element of the magnetic head, a control line configured to control head lifting, and a signal line configured to drive a micro actuator, and in recent years, it further includes an assist recording signal line and a connection terminal, and the like. Corresponding to this, in the FPC in which the connection end of the wiring member is bonded, the number of connection pads and the number of wirings are increasing. The increase in the number of wirings demands for increase in an area of the FPC to ensure a space for installing the wirings and a space for arranging them.

In the recent years, the number of installed magnetic disks is on an increasing trend accompanying an increased HDD capacity, as a result of which the number of magnetic heads is also increasing. The increase in the number of the magnetic heads demands to further increase the number of the connection pads and the number of the wirings in the FPC. However, there is a limit to a size of the FPC, and it is becoming difficult to ensure a space for installing the connection pads and the space for arranging the wirings.

DETAILED DESCRIPTION

Various embodiments will be described hereinafter with reference to the accompanying drawings. In general, according to one embodiment, a flexible printed wiring board to be mounted on an actuator assembly of a disk device comprises: a base insulation layer; a plurality of first wirings on the base insulation layer; an intermediate insulation layer overlapped with the first wirings and the base insulation layer; a plurality of connection pads on the intermediate insulation layer; a cover insulation layer overlapped with the connection pads and the intermediate insulation layer and including a plurality of openings through which the connection pads are exposed to the cover insulation layer; and conductive vias electrically connecting the first wirings to at least a part of the connection pads respectively, the conductive vias being arranged to overlap with the connection pads in a thickness direction of the flexible printed wiring board.

It should be noted that the disclosure herein is merely an example, and configurations with suitable modifications which sustains the gist of the invention and which can easily be conceived by a person skilled in the art are inherently encompassed by the scope of the present invention. Further, to clarify the explanation, the drawings may in cases be schematically depicted regarding widths, thicknesses, and shape of respective components as compared to an actually implemented configuration, however, these are merely examples and do not limit the interpretation of the present invention. Further, in the description and the drawings, elements identical to those which have already been described in connection to already-cited drawings are given same reference signs and detailed descriptions thereof may suitably be omitted.

First Embodiment

As a disk device, a hard disk drive (HDD) according to a first embodiment will be described in detail.

Figure 1:
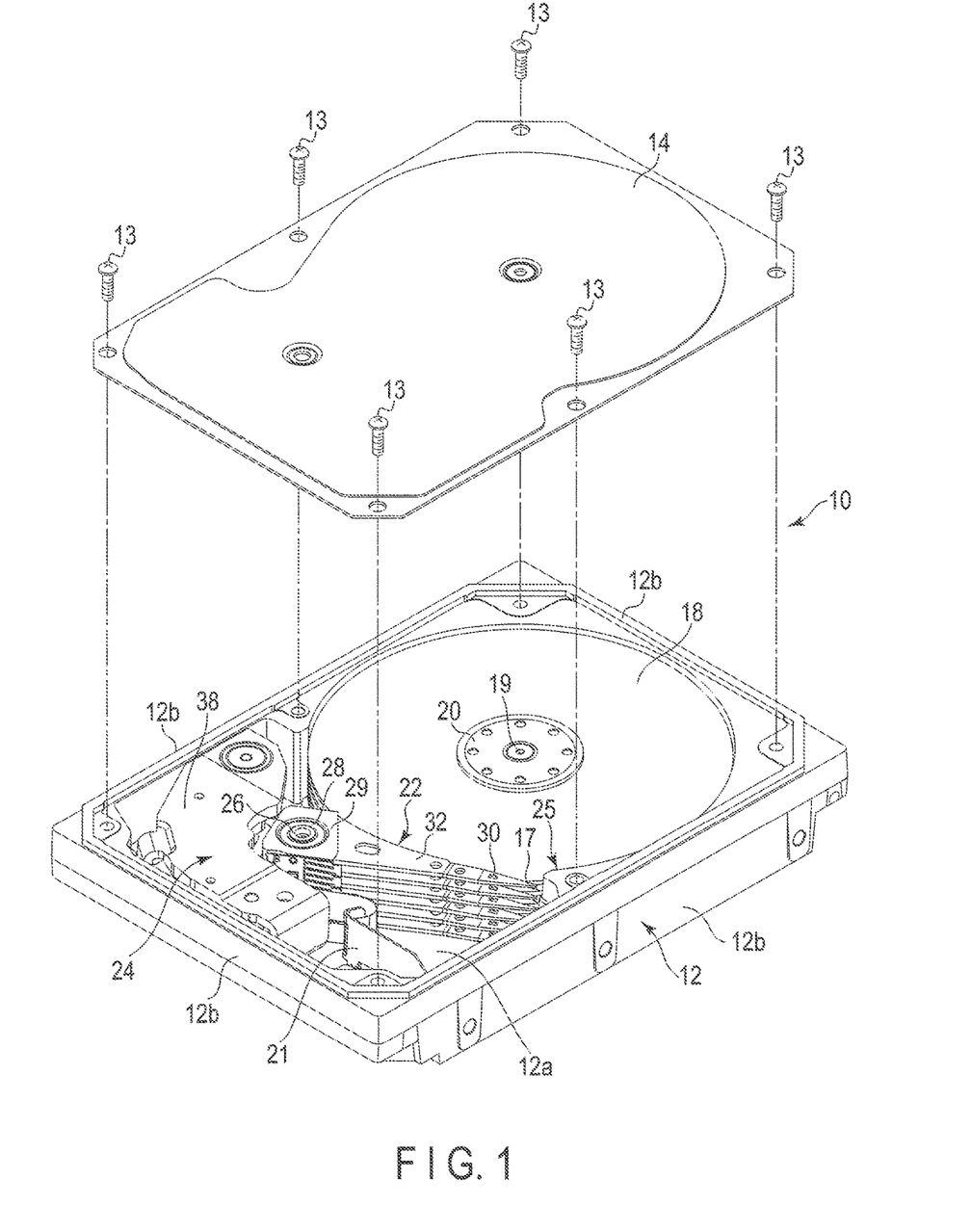
FIG. 1 is an exploded perspective view of a hard disk drive (HDD) according to a first embodiment.

FIG. 1 is an exploded perspective view of the HDD according to the first embodiment illustrated with its top cover detached.

The HDD comprises a flat, substantially rectangular housing 10. The housing 10 comprises a rectangular box-shaped base 12 with an opened upper surface and a top cover 14. The base 12 includes a rectangular bottom wall 12a facing the top cover 14 with a space in between and a plurality of side walls 12b standing along a circumference of the bottom wall, and is integrally formed of aluminum, for example. The top cover 14 is formed in a rectangular plate shape by stainless steel, for example. The top cover 14 is fastened to the side walls 12b of the base 12 by a plurality of screws 13, and closes the upper opening of the base 12.

A plurality of magnetic disks 18 as recording media and a spindle motor 19 as a driving unit configured to support and drive the magnetic disks 18 are provided within the housing 10. The spindle motor 19 is mounted on the bottom wall 12a. Each of the magnetic disks 18 is for example 3.5 inches, and includes a magnetic recording layer on its upper and/or lower surfaces. Each of the magnetic disks 18 is coaxially fitted to a hub (not shown) of the spindle motor 19 and is clamped by a clamp spring 20 and thereby fixed to the hub. Each of the magnetic disks 18 is supported in a state of being arranged parallel to the bottom wall 12a of the base 12. The plurality of magnetic disks 18 are rotated at a predetermined revolution by the spindle motor 19. In the present embodiment, for example, five magnetic disks 18 are accommodated in the housing 10, however, the number of the magnetic disks 18 is not limited hereto.

Within the housing 10 are provided a plurality of magnetic heads 17 configured to perform recording and reading information on the magnetic disks 18 and an actuator assembly (carriage assembly) 22 supporting these magnetic heads 17 to be movable relative to the magnetic disks 18. Further, within the housing 10 are provided a voice coil motor (hereafter termed "VCM") 24 configured to pivotably move and position the actuator assembly 22, a ramp load mechanism 25 configured to retain the magnetic heads 17 at an unloaded position separated away from the magnetic disks 18 upon when the magnetic heads 17 move to an outermost circumference of the magnetic disks 18, and a wiring board unit (FPC unit) 21 in which electronic components such as converting connectors and the like.

The carriage assembly 22 comprises an actuator block 29 supported via a bearing unit 28 to be rotatable about a support shaft 26, the rotatable bearing unit 28, a plurality of arms 32 extending from the actuator block 29, and suspension assemblies 30 extending from the respective arms 32. The magnetic heads 17 are supported at distal ends of the respective suspension assemblies 30. The support shaft 26 stands on the bottom wall 12a. Each of the magnetic heads 17 comprises a reading element and a writing element.

A printed circuit board (not shown) is fixed to an outer surface of the bottom wall 12a of the base 12. The printed circuit board constitutes a control unit, and this control unit is configured to control operations of the spindle motor 19 and further controls operations of the VCM 24 and the magnetic heads 17 via the wiring board unit 21.

Figure 2:
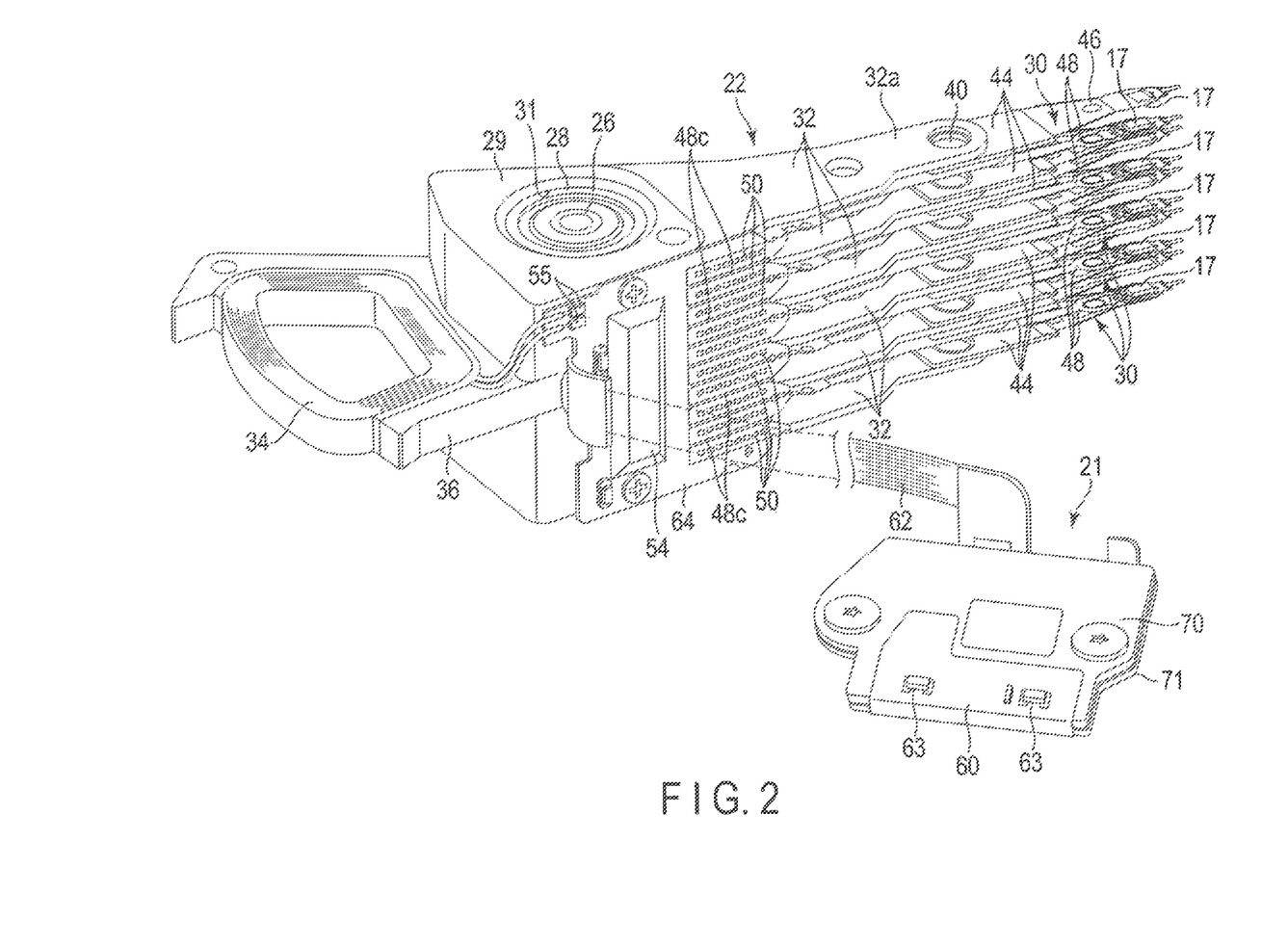
FIG. 2 is a perspective view illustrating an actuator assembly and a wiring board unit (FPC unit) of the HDD.
Figure 3:
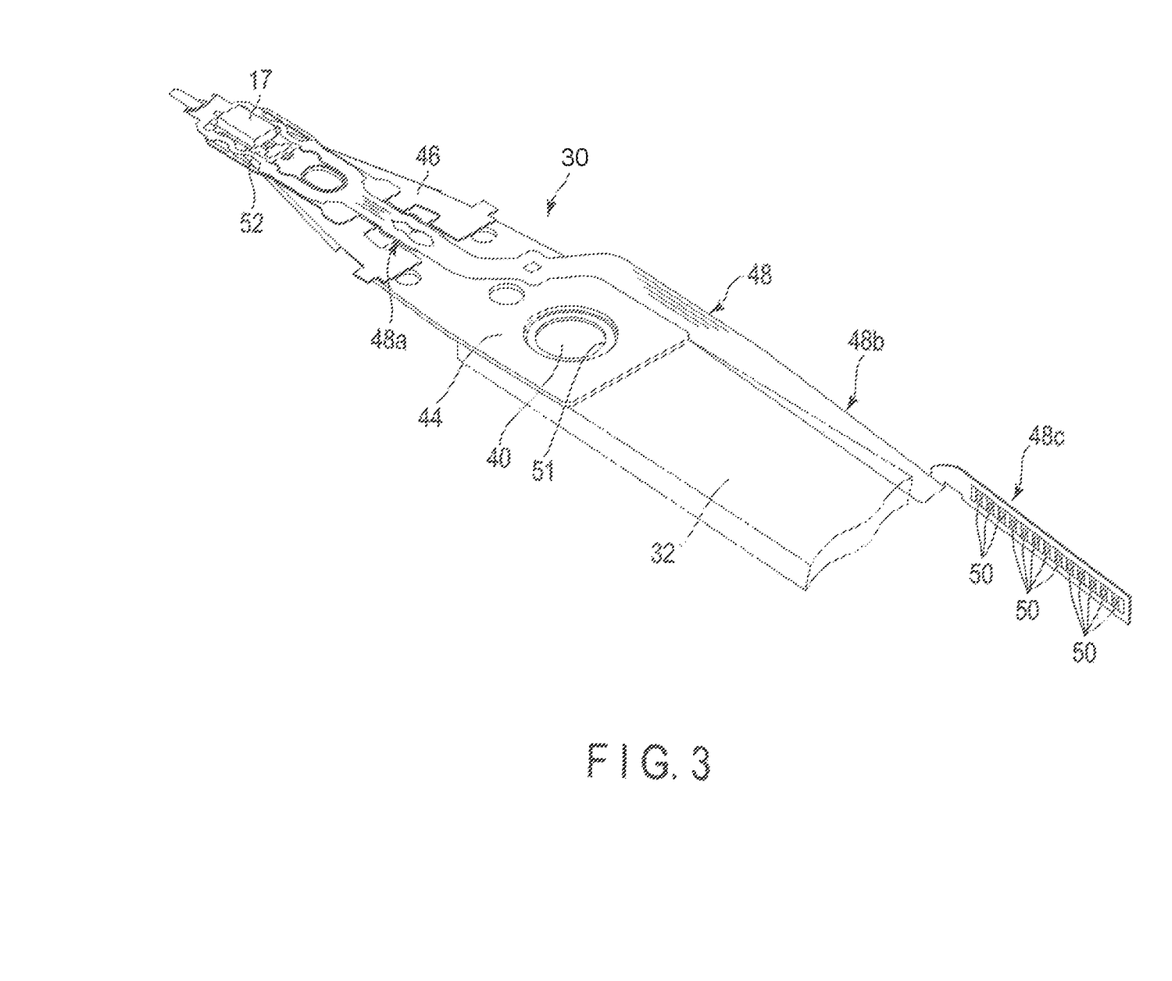
FIG. 3 is a perspective view illustrating a suspension assembly of the actuator assembly.

FIG. 2 is a perspective view illustrating the actuator assembly and the FPC unit, and FIG. 3 is a perspective view illustrating the suspension assembly. As shown in FIG. 2, the actuator assembly 22 comprises the actuator block 29 including a through hole 31, the bearing unit 28 provided within the through hole 31, the plurality, for example, six, arms 32 extending from the actuator block 29, the suspension assemblies 30 attached to the respective arms 32, and the magnetic heads 17 supported on the suspension assemblies 30. The actuator block 29 is supported by the bearing unit 28 so as to be rotatable about the support shaft (axis) 26 standing on the bottom wall 12a.

In this embodiment, the actuator block 29 and the six arms 32 are formed integrally by aluminum and the like, and constitute a so-called E-block. The arms 32 are formed for example in narrow flat plate shapes, and extend from the actuator block 29 in a direction perpendicular to the support shaft 26. The six arms 32 are provided parallel to one another with intervals in between them.

The actuator assembly 22 includes a support frame 36 extending from the actuator block 29 in a direction opposite to the arms 32, and a voice coil 34 configuring a part of the VCM 24 is supported by this support frame 36. As illustrated in FIG. 1, the voice coil 34 is located between a pair of yokes 38, one of which is fixed on the base 12, and constitutes the VCM 24 together with these yokes 38 and a magnet fixed to one of the yokes.

The actuator assembly 22 includes ten suspension assemblies 30 respectively supporting the magnetic heads 17, and these suspension assemblies 30 are attached to the distal ends 32a of the respective arms 32. The plurality of suspension assemblies 30 include uphead suspension assemblies configured to support the magnetic heads 17 upward and downhead suspension assemblies configured to support the magnetic heads 17 downward. These uphead suspension assemblies and the downhead suspension assemblies are configured by arranging the suspension assemblies 30 having an identical structure with their upper and lower orientations changed.

In the present embodiment, in FIG. 2, a downhead suspension assembly 30 is attached to the uppermost arm 32, and an uphead suspension assembly 30 is attached to the lowermost arm 32. On each of the four arms 32 in between, an uphead suspension assembly 30 and a downhead suspension assembly 30 are attached thereto.

As illustrated in FIG. 3, each suspension assembly 30 comprises a substantially rectangular base plate 44, an elongate plate-shaped load beam 46, and an elongate band-shaped flexure (wiring member) 48. The load beam 46 has its base end overlapped and fixed to an end of the base plate 44. The load beam 46 extends from the base plate 44 and is formed narrower toward its extended end. The base plate 44 and the load beam 46 are formed for example by stainless steel.

The base plate 44 includes a circular opening at its base end and an annular projection 51 located to surround the opening. The base plate 44 is fastened to the distal end 32a of the arm 32 by having the projection 51 fitted to a fitting hole 40 formed at the distal end 32a of the arm 32 to press fit this projection 51 therein (see FIG. 2). A base end of the load beam 46 is arranged to overlap the distal end of the base plate 44, and is fixed to the base plate 44 by being welded at plural spots.

The flexure 48 comprises a metal plate such as stainless steel (base layer) to be a base thereof, an insulation layer formed on this metal plate, a conductive layer that configures a plurality of wirings (wiring pattern) formed on the insulation layer, and a cover layer (protection layer, insulation layer) covering the conductive layer. The flexure 48 is configured as an elongate band-shaped laminated plate.

The flexure 48 includes a distal end-side portion 48a and a base end-side portion 48b. The distal end-side portion 48a is attached to the load beam 46 and the base plate 44. The base end-side portion 48b extends outward from a side edge of the base plate 44, and extends further along the arm 32 to the base end (actuator block 29) of the arm 32.

The flexure 48 includes a distal end located on the load beam 46 and a gimbal (elastic support) 52 formed on the distal end and being freely displaceable. The magnetic head 17 is mounted on the gimbal 52. The wirings of the flexure 48 are electrically connected to the reading and writing elements of the magnetic head 17, a heater, and other members.

The flexure 48 includes a connection end (tail connection terminal portion) 48c provided at one end of the base end-side portion 48b. The connection end 48c is formed in an elongate rectangular shape. The connection end 48c is bent at a substantially right angle relative to the base end-side portion 48b, and is located substantially perpendicular to the arm 32. The connection end 48c is provided with a plurality of, for example, thirteen connection terminals (connection pads) 50. These connection terminals 50 are respectively connected to the wirings of the flexure 48. That is, the plurality of wirings of the flexure 48 extend over substantially entire length of the flexure 48, having one ends electrically connected to the magnetic head 17, and other ends connected to the connection terminals (connection pads) 50 of the connection end 48c.

As illustrated in FIG. 2, the ten suspension assemblies 30 extend from the six arms 32, facing each other substantially in parallel, and are arranged with predetermined spaces in between them. These suspension assemblies 30 configure five downhead suspension assemblies and five uphead suspension assemblies. The downhead suspension assembly 30 and the uphead suspension assembly 30 of each pair are arranged parallel to each other with the predetermined interval in between them, and their magnetic heads 17 are located to face each other. These magnetic heads 17 are located to face both surfaces of their corresponding magnetic disk 18.

As illustrated in FIG. 2, the FPC unit 21 integrally includes a substantially rectangular base 60, an elongate band-shaped relay portion 62 extending from a side edge of the base 60, and a substantially rectangular bonding portion (FPC bonding portion) 64 provided continuous to a distal end of the relay portion 62. These base 60, relay portion 62, and bonding portion 64 are formed of a flexible printed wiring board (FPC). The flexible printed wiring board (FPC) is configured as a multilayer circuit board including two conductive layers. Details of the FPC will be described later.

Electronic components such as converting connectors (not shown), a plurality of capacitors 63, and the like are implemented on one surface (outer surface) of the base 60, and are electrically connected to wirings (not shown). Two metal plates 70, 71 that function as reinforcement plates are each adhered to another surface (inner surface) of the base 60. The base 60 is bent by 180 degrees at its portion between the metal plate 70 and the metal plate 71, and the metal plates 70, 71 are overlapped to face each other. The base 60 is arranged on the bottom wall 12a of the housing 10, and is screw fastened to the bottom wall 12a by two screws. The converting connectors on the base 60 are connected to the control circuit board provided on a bottom surface side of the housing 10.

The relay portion 62 extends from a first side edge of the base 60 substantially perpendicular to this first side edge, and further, it extends toward the actuator assembly 22 by shifting its orientation at substantially right angle.

The bonding portion 64 provided at the extended end of the relay portion 62 is formed in a rectangular shape having a height and a width that are substantially same as those of a side surface (mount surface) of the actuator block 29. The bonding portion 64 is adhered to the mount surface of the actuator block 29 via a base plate formed of aluminum, and is further fastened on the mount surface by fixing screws. The connection ends 48c of the ten flexures 48 are bonded to a plurality of connecting portions of the bonding portion 64, and are electrically connected to the wirings of the bonding portion 64. The plurality of connection ends 48c are arranged in a direction parallel to the support shaft 26. A head IC (head amplifier) 54 is implemented on the bonding portion 64, and this head IC 54 is connected to the connection ends 48c and the base 60 via the wirings of the FPC. Further, the bonding portion 64 includes a pair of connection pads 55, and the voice coil 34 is connected to these connection pads 55.

The ten magnetic heads 17 of the actuator assembly 22 are electrically connected to the base 60 respectively via the wirings of the flexures 48, the connection ends 48c, the bonding portion 64 and the relay portion 62 of the FPC unit 21. Further, the base 60 is electrically connected to the printed circuit board on the bottom surface side of the housing 10 via the converting connector.

Figure 4:
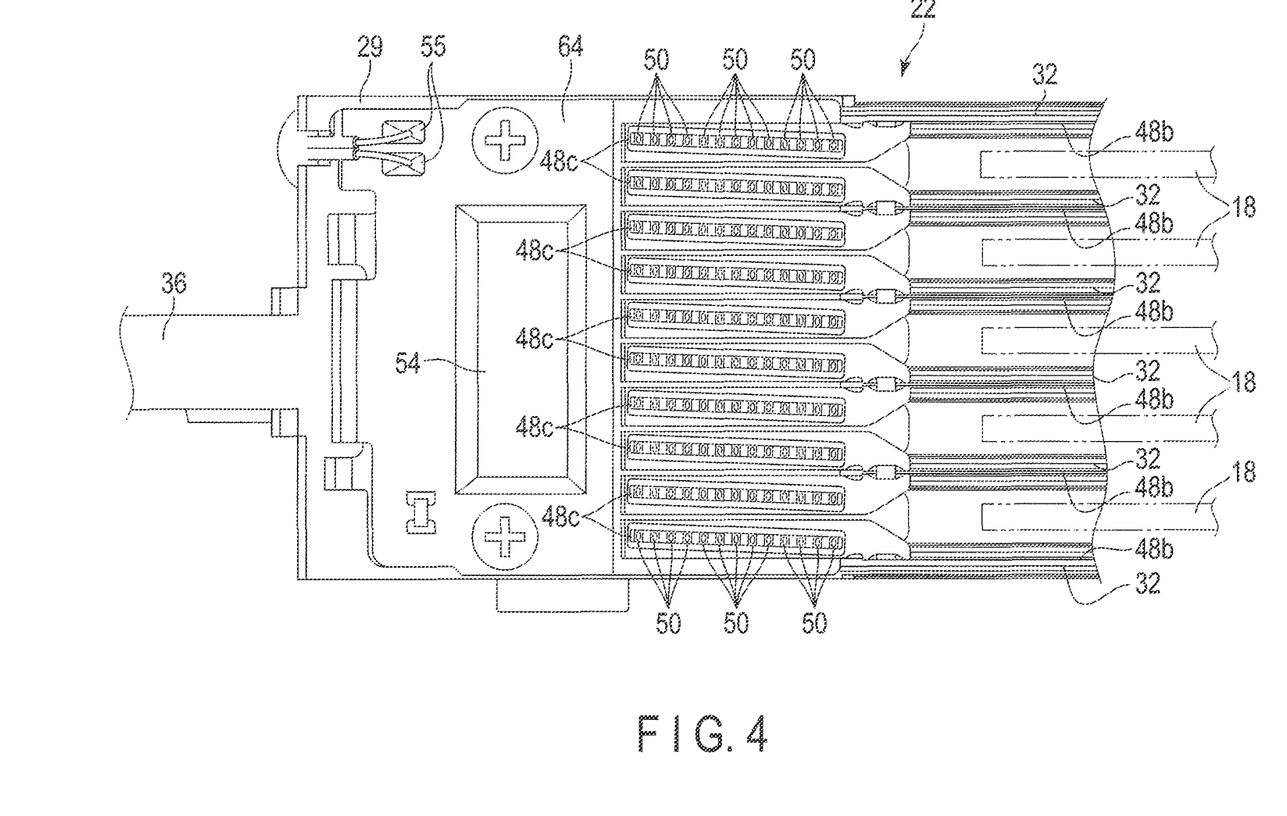
FIG. 4 is a side view illustrating an actuator block of the actuator assembly, a bonding portion (FPC bonding portion) of the FPC unit, and a connection end of a flexure.

A wiring structure of the FPC bonding portion 64 will be described in detail. FIG. 4 is a side view illustrating the bonding portion 64 attached to the actuator block and the plurality of connection ends, and FIG. 5 is a side view illustrating the bonding portion 64 before bonding the connection ends.

Figure 5:
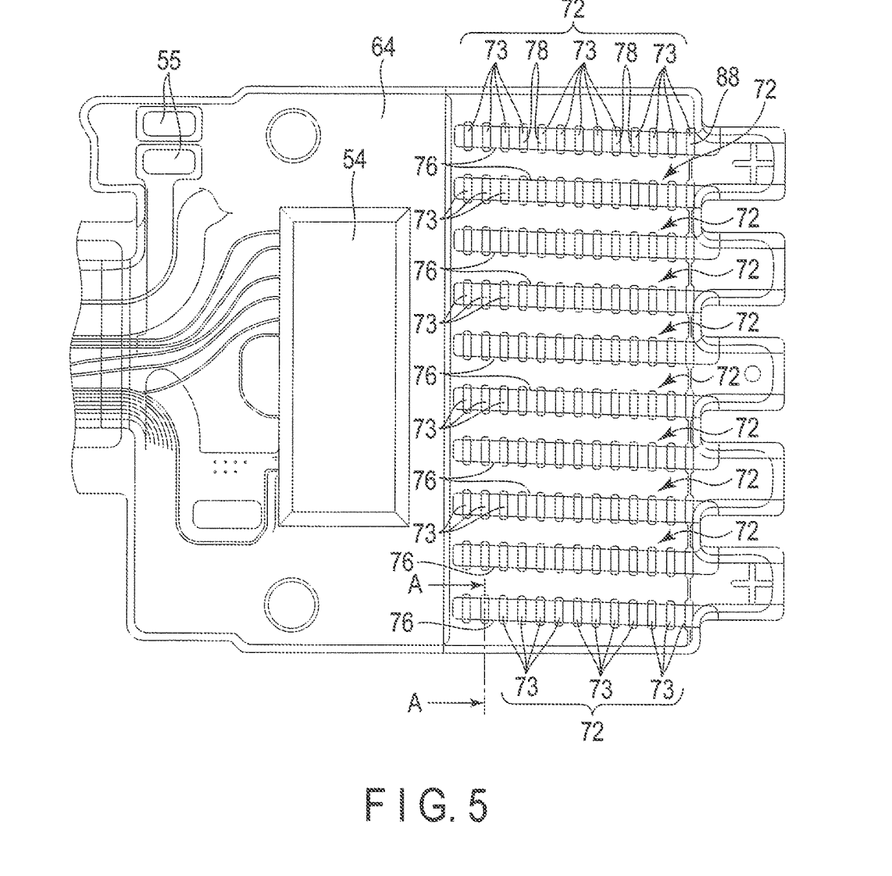
FIG. 5 is a side view illustrating the bonding portion of the FPC unit.

As illustrated in FIG. 5, the bonding portion 64 of the FPC includes ten connection pad groups 72 corresponding to the connection ends 48c of the suspension assemblies 30. Each of the connection pad groups 72 includes thirteen connection pads 73 for example, which are provided in a line, and each of these connection pads 73 is electrically connected to the base 60 via a wiring. The thirteen connection pads 73 in each of the connection pad groups 72 is arranged in a line in a direction substantially parallel to the arms 32 with a predetermined interval between them. Further, the ten connection pad groups 72 are arranged in a direction parallel to the support shaft 26, that is, in a height direction of the actuator block 29 with a predetermined interval between each other and substantially parallel to each other. These connection pads 73 are located in band-shaped openings 76 formed in the cover insulation layer of the FPC to be described later, and are exposed to outside via the openings. Further, in a state before bonding the connection ends 48c, a solder plating layer 78 is formed on each of the connection pads 73.

Figure 6:
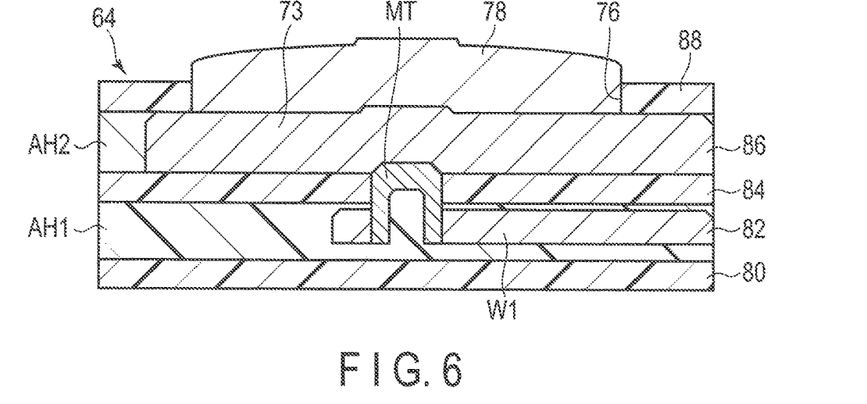
FIG. 6 is a cross-sectional illustrating the FPC bonding portion taken along a line A-A in FIG. 5.
Figure 7:
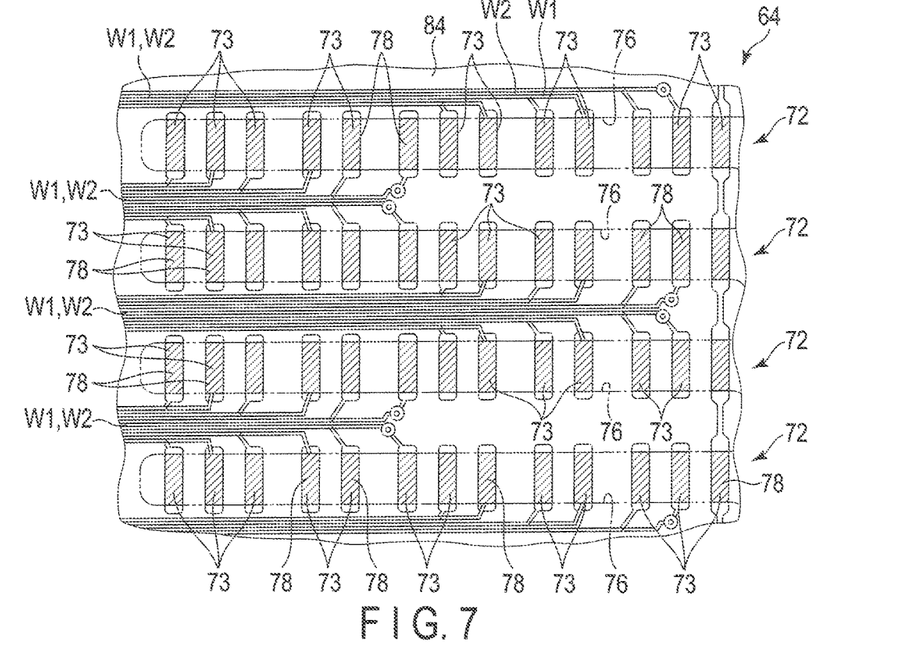
FIG. 7 is a plan view of the FPC bonding portion with a cover insulation layer being omitted.
Figure 8:
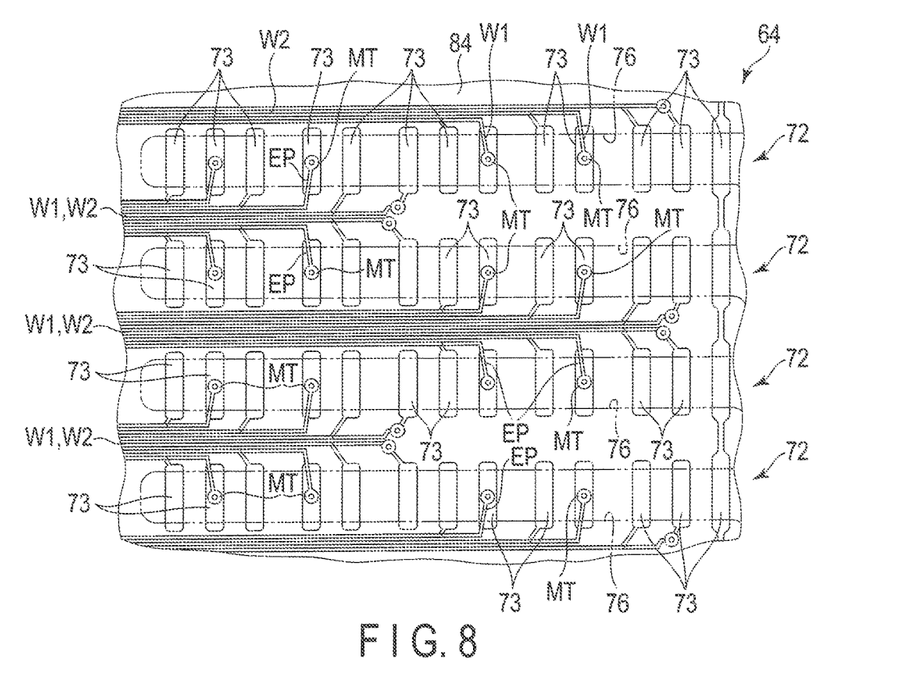
FIG. 8 is a plan view of the FPC bonding portion with the cover insulation layer and solder plating omitted.
Figure 9:
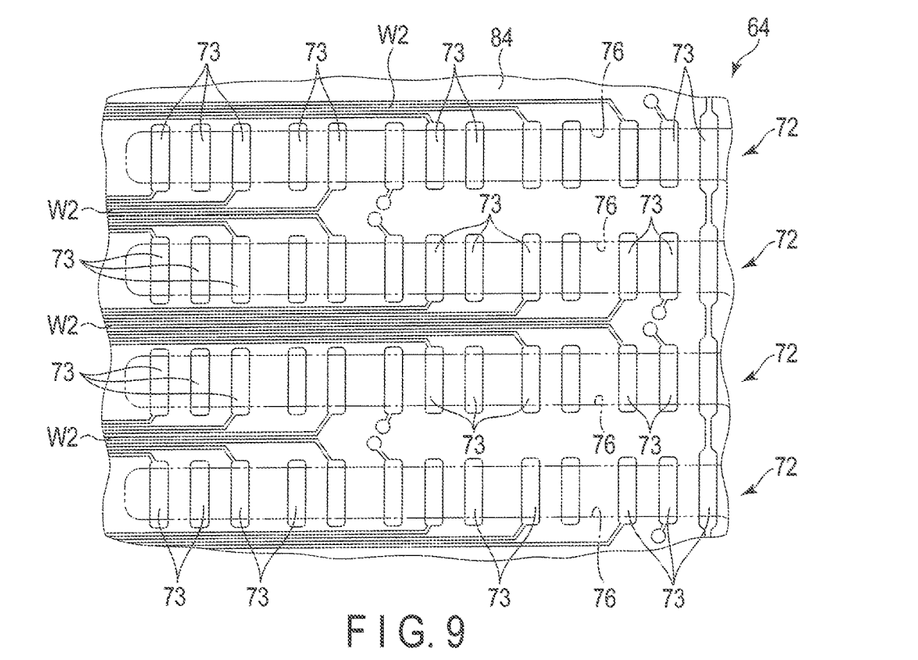
FIG. 9 is a plan view illustrating wirings and connection pads in a second conductive layer of the FPC bonding portion.
Figure 10:
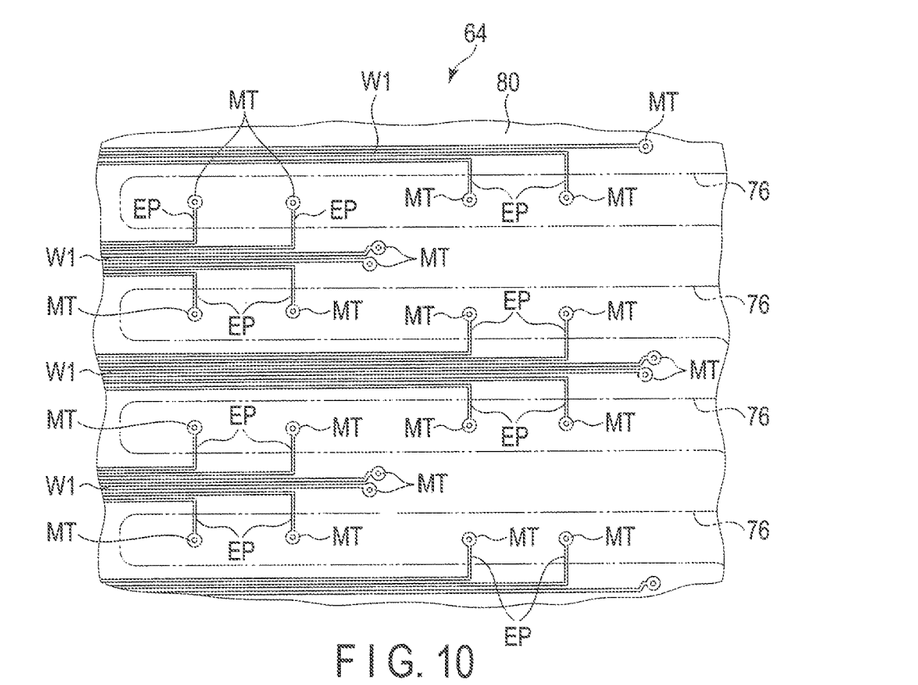
FIG. 10 is a plan view illustrating wirings and connection pads in a first conductive layer of the FPC bonding portion.

FIG. 6 is a cross-sectional view taken along a line A-A in FIG. 5, FIG. 7 is a plan view of the FPC bonding portion with the cover insulation layer omitted, and FIG. 8 is a plan view of the FPC bonding portion with the cover insulation layer and the solder plating omitted. FIG. 9 is a plan view illustrating wirings and connection pads in a second conductive layer of the FPC bonding portion, and FIG. 10 is a plan view illustrating wirings and connection pads of a first conductive layer of the FPC bonding portion.

As illustrated in FIG. 6, the flexible wiring board that constitutes the bonding portion 64 is configured as a multilayer wiring board. Specifically, the flexible wiring board comprises, for example, a base insulation layer 80 formed of polyimide, a first conductive layer 82 adhered on the base insulation layer 80 by an adhesive layer AH1, an intermediate insulation layer 84 adhered on the first conductive layer 82 by the adhesive layer AH1, a second conductive layer 86 provided on the intermediate insulation layer 84, and a protective insulation layer 88 adhered to the second conductive layer by an adhesive layer AH2. The first conductive layer 82 which is formed of a copper foil for example is patterned, and includes a number of first wirings W1. Further, the second conductive layer 86 which is formed of a copper foil for example is patterned, and includes a number of second wirings W2 and the number of connection pads 73. The protective insulation layer 88 includes the plurality of openings 76. The plurality of connection pads 73 are exposed on an outer surface of the FPC via the openings 76. The solder plating layer 78 is formed on an exposed surface of each of the connection pads 73, and protrudes to an outer surface side of the FPC via the opening 76.

A part of the first wirings W1 is electrically connected to the connection pads 73 via plating through holes (conductive vias or blind vias) MT. The plating through holes MT are provided at positions overlapping the connection pads 73 in the thickness direction of the FPC.

As illustrated in FIGS. 7 to 9, the plurality of connection pads 73 formed by the second conductive layer 86 being an upper layer configure the plurality of connection pad groups 72. Each of the connection pad groups 72 includes the plurality of, for example, thirteen, connection pads 73 arranged in a line with the interval between each other at the positions facing the openings 76 of the cover insulation layer. Each of the connection pads 73 is formed with a predetermined width in the direction parallel to the support shaft 26 (width direction).

The plurality of second wirings W2 of the second conductive layer 86 are arranged by being distributed in regions on both sides of each of the openings 76, that is, in plural strands, for example three strands, respectively in the regions on both the upper and lower sides of each connection pad group 72. One ends of the second wirings W2 are respectively connected to their corresponding connection pads 73. As illustrated in FIG. 7, the solder plating layers 78 are formed on the respective connection pads 73, and are exposed in the openings 76. The connection pads 73 located at the one ends of the connection pad groups 72 configure the connection pads 73 for micro-actuator drive. The ten connection pads 73 are connected to one another via wirings.

As illustrated in FIGS. 7, 8, and 10, the plurality of first wirings W1 formed by the first conductive layer 82 that is a lower layer are arranged by being distributed in regions on both sides of each of the openings 76, that is, in plural strands, for example three strands, respectively in the regions on both the upper and lower sides of each connection pad group 72. For each of the connection pad groups 72, six first wirings W1 are provided. In the thickness direction of the FPC, most parts of the first wirings W1 are arranged by being overlapped with most parts of the second wirings W2 with the intermediate insulation layer 84 in between them. Other ends of the second wirings W2 extend to the relay portion 62 via the head IC 54, further pass through the relay portion 62 and extend to the base 60.

Among the six first wirings W1, one ends EP of the four first wirings W1 each bend to a connection pad 73 side and extend to positions overlapping with the connection pads 73. In this embodiment, these one ends EP are bent at substantially right angle, and extend along the width direction of the connection pads 73.

Due to this, most parts of the one ends EP are positioned to overlap with the connection pads 73 in the thickness direction. Further, a distal end of each of the one ends EP is electrically connected to the connection pad 73 via the plating through hole (conduction via) MT. The plating through hole MT is located overlapping a center portion of the connection pad 73.

One ends of other two first wirings W1 are electrically connected to the second wirings W2 extending from the connection pads 73 via the plating through holes MT in a region between adjacent connection pad groups 72.

Another end side of the first wiring W1 extends to the relay portion 62 via the head IC 54, and further passes through the relay portion 62 and extends to the base 60.

As illustrated in FIG. 6, the solder plating layer 78 formed on each connection pad 73 has its center portion corresponding to the plating through hole MT protruding slightly higher than its other portions.

As illustrated in FIGS. 4 and 5, the FPC bonding portion 64 configured as above has its base insulation layer 80 side fixed to the mount surface of the actuator block 29 via the protective plates. The connection ends 48c of the flexures 48 are arranged by being overlapped with the respective connection pad groups 72 of the bonding portion 64. The connection terminals 50 at the connection ends 48c make contact with their corresponding connection pads 73 via their respective solder plating layers 78. The connection terminals 50 at the connection ends 48c are mechanically and electrically solder bonded to their corresponding connection pads 73 by the solder plating layers 78 being melted by an optical unit or a thermal unit.

As illustrated in FIG. 1, the actuator assembly 22 is supported to pivotably and freely movable about the support shaft 26 in a state where the actuator assembly 22 configured as above and the FPC unit 21 are assembled in the base 12. Each of the magnetic disks 18 is located between two suspension assemblies 30. Upon operation of the HDD, the magnetic heads 17 attached to the suspension assemblies 30 respectively face the upper and lower ends of the magnetic disks 18. The base 60 of the FPC unit 21 is fixed to the bottom wall 12a of the base 12.

According to the HDD and the flexible wiring board configured as above, the pluralities of first wirings and second wirings are arranged to overlap in the thickness direction of the FPC at the FPC connecting portions, and the first wirings and the connection pads are connected via the plating through holes (conductive vias) provided at the positions overlapping the connection pads in the second conductive layer. By the above configuration, gaps between the conductive vias and the first and second wirings (insulation portions) become unnecessary, and a large number of wirings can be arranged or extended in upper and lower regions of the connection pads in the height direction of the FPC bonding portion (direction parallel to the support shaft). Due to this, even in a case where the numbers of the connection pads and the wirings increase, installation spaces for the connection pads and the wirings can be secured without increasing a size of the FPC bonding portion. Due to the above, according to the first embodiment, the flexible printed wiring substrate for a disk device in which the large numbers of wirings and connection pads can be arranged without increasing the installation spaces as well as the disk device comprised of the same can be achieved.

The number of the connection pads and the numbers of the first and second wirings in the FPC bonding portion are not limited to the above embodiment, and may be increased or decreased as needed. Further, the number of the first wirings and the number of the second wirings connected to the connection pads are set equal, however, no limitation is made hereto, and the number of one of the wirings may be set greater or less than the number of the other of the wirings.

Next, print wiring boards of HDDs according to other embodiments will be described. In the other embodiments described below, portions identical to the aforementioned first embodiment are given identical reference numerals and detailed descriptions thereof are omitted or simplified, and portions that differ from the first embodiment will mainly be described.

Second Embodiment

Figure 11:
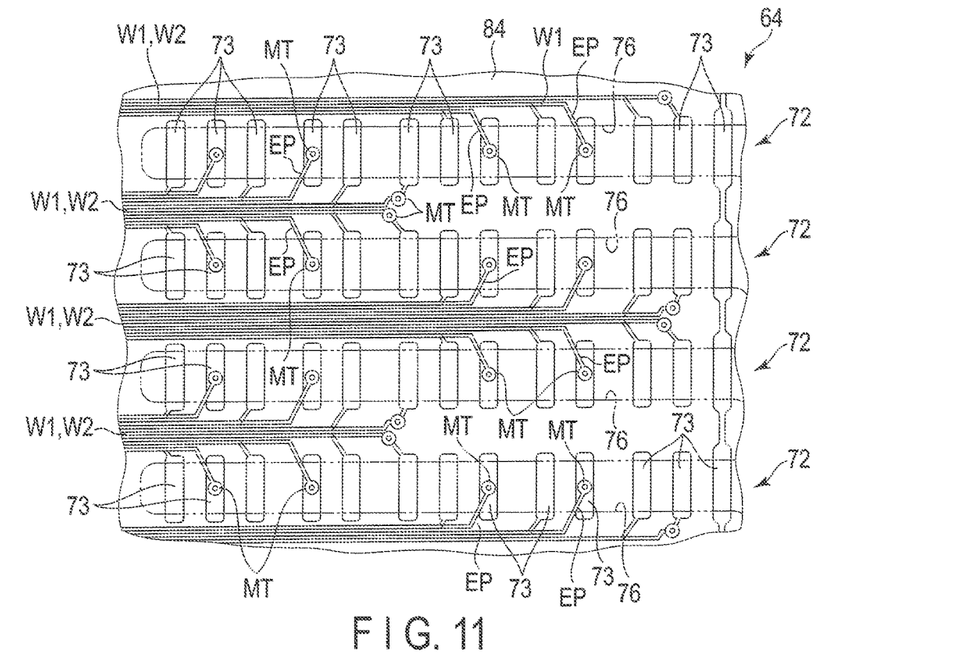
FIG. 11 is a plan view of a bonding portion of a flexible printed wiring board according to a second embodiment.

FIG. 11 is a plan view illustrating a bonding portion of a flexible printed wiring board used in an HDD according to a second embodiment in an enlarged view. In FIG. 11, a cover insulation layer and solder plating layers are omitted. According to the second embodiment, one ends EP of first wirings W1 are bent to intersect connection pads 73 obliquely. For example, the one ends EP are tilted at about 30 degrees relative to a width direction of the connection pads 73. Due to this, the one ends EP have less areas overlapped with the connection pads 73 in a thickness direction of an FPC.

When the first wirings W1 are arranged elsewhere than regions overlapping the connection pads 73, thermal absorption characteristic upon solder bonding changes. Due to this, as in the second embodiment, melting characteristic of the solder plating layers upon the solder bonding can be controlled by the connection pads 73 by changing the overlapped areas of the one ends EP of the first wirings W1 and the connection pads 73.

Third Embodiment

Figure 12:
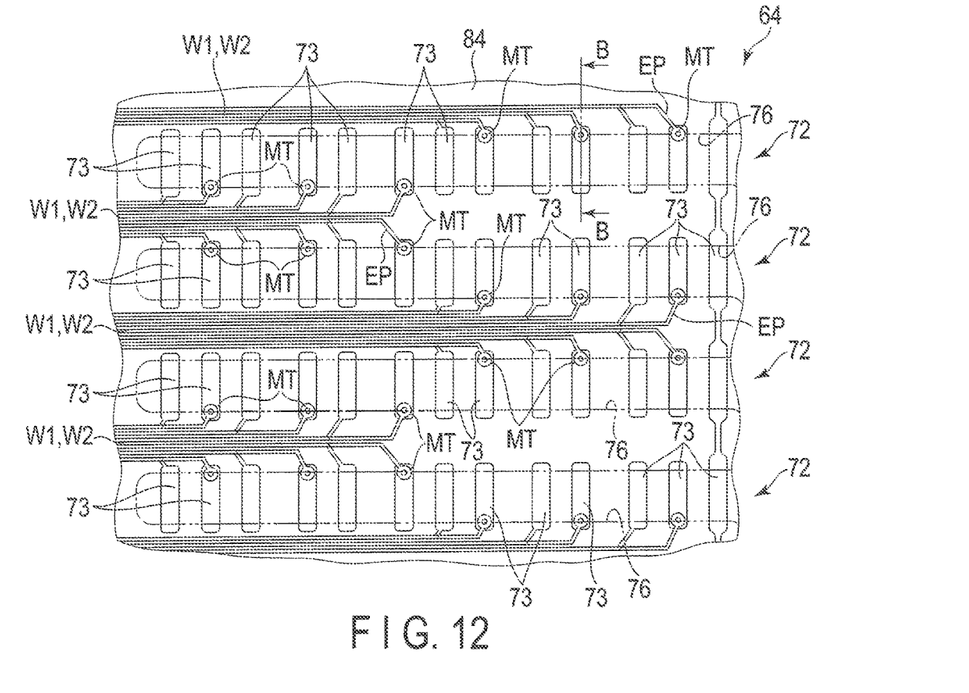
FIG. 12 is a plan view of a bonding portion of a flexible printed wiring board according to a third embodiment.
Figure 13:
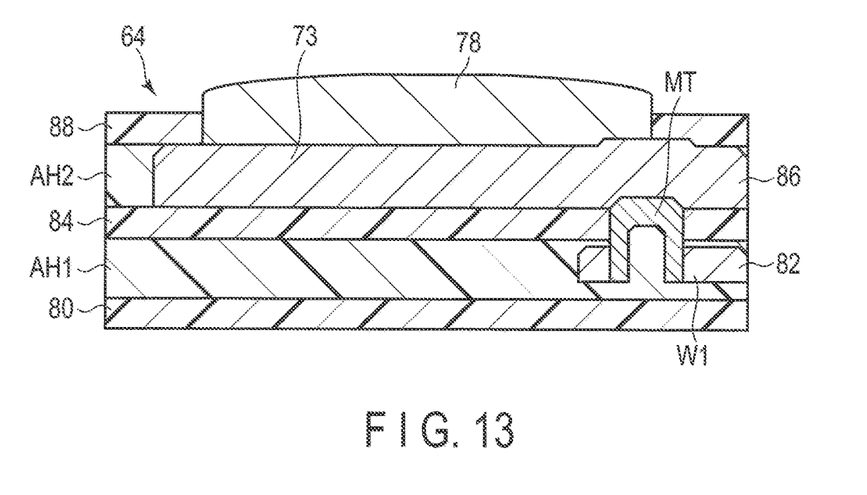
FIG. 13 is a cross-sectional view of the bonding portion taken along a line B-B in FIG. 12.

FIG. 12 is a plan view illustrating a bonding portion of a flexible printed wiring board used in an HDD according to a third embodiment in an enlarged view, and FIG. 13 is a cross-sectional view of the bonding portion along a line B-B in FIG. 12. In FIG. 12, a cover insulation layer and solder plating layers are omitted.

According to the third embodiment, as illustrated in FIGS. 12 and 13, plating through holes (conductive vias) MT that electrically connect one ends EP of first wirings W1 to connection pads 73 are arranged at positions overlapping one ends of the connection pads 73 in a width direction. According to the above configuration, as illustrated in FIG. 13, bulges at center portions of solder plating layers 78 plated on the connection pads 73 can be reduced. As a result, connection strength uniformity of flexures with connection terminals can be maintained.

Fourth Embodiment

Figure 14:
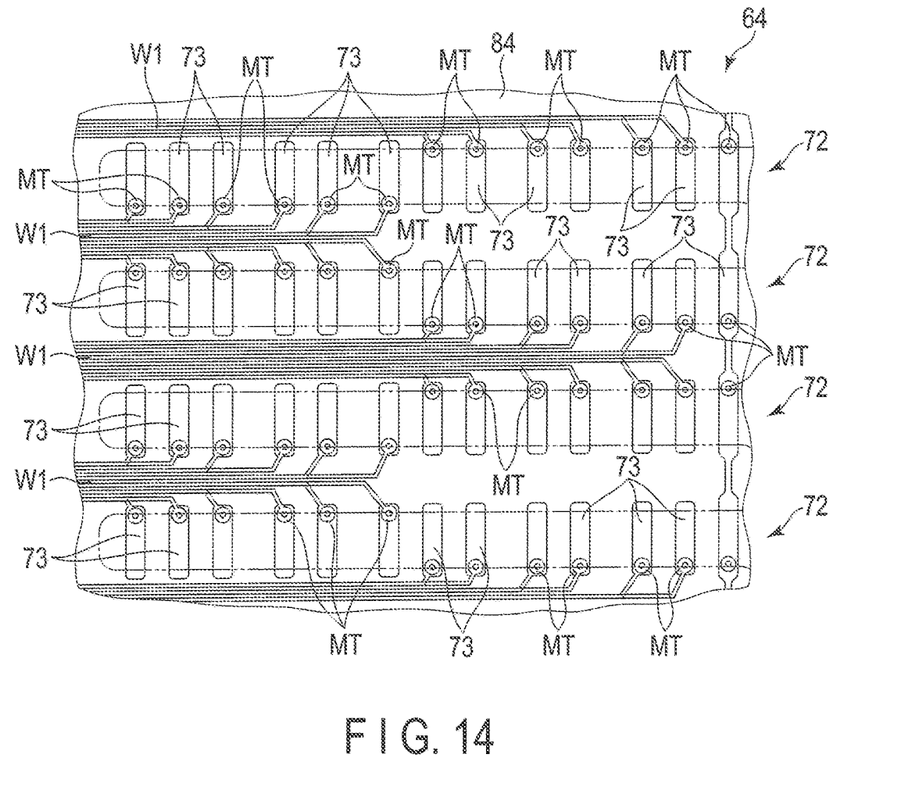
FIG. 14 is a plan view of a bonding portion of a flexible printed wiring board according to a fourth embodiment.

FIG. 14 is a plan view illustrating a bonding portion of a flexible printed wiring board used in an HDD according to a fourth embodiment in an enlarged view. In FIG. 14 a cover insulation layer and solder plating layers are omitted.

According to the fourth embodiment, as illustrated in the drawing, a second conductive layer of an FPC forms only a large number of connection pads 73 and omits second wirings. As a substitute thereof, all of wirings are configured by first wirings W1 formed of a first conductive layer. The plurality of first wirings W1 are arranged by being distributed in regions on both sides of each connection pad group 72. One end of each of the first wirings W1 is electrically connected to the connection pad 73 in an upper layer via a plating through hole (conduction via) MT. The plurality of first wirings W1 arranged on one side of the connection pad groups 72 are connected to widthwise one ends of their corresponding connection pads 73. The plurality of first wirings W1 arranged on another side of the connection pad groups 72 are connected to widthwise other ends of their corresponding connection pads 73.

According to the fourth embodiment, the FPC not provided with the second wirings in the upper layer can also realize uniformized bulges of solder plating layers 78 on all the connection pads 73, and variations in connection strength (bonding strength) can be reduced.

Fifth Embodiment

Figure 15:
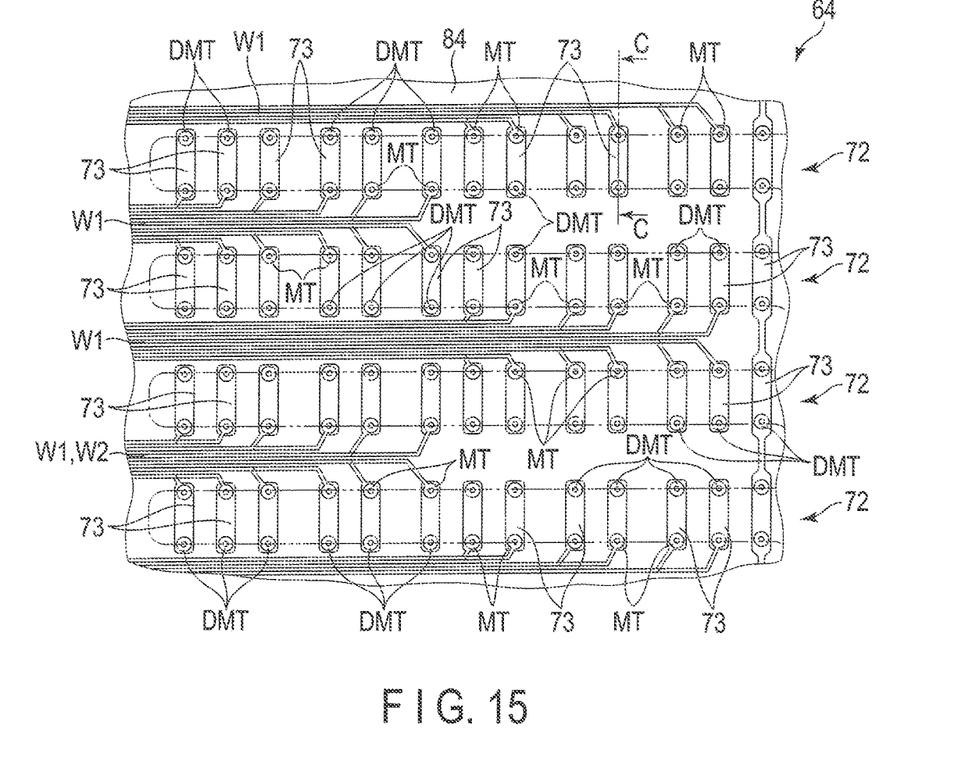
FIG. 15 is a plan view of a bonding portion of a flexible printed wiring board according to a fifth embodiment.
Figure 16:
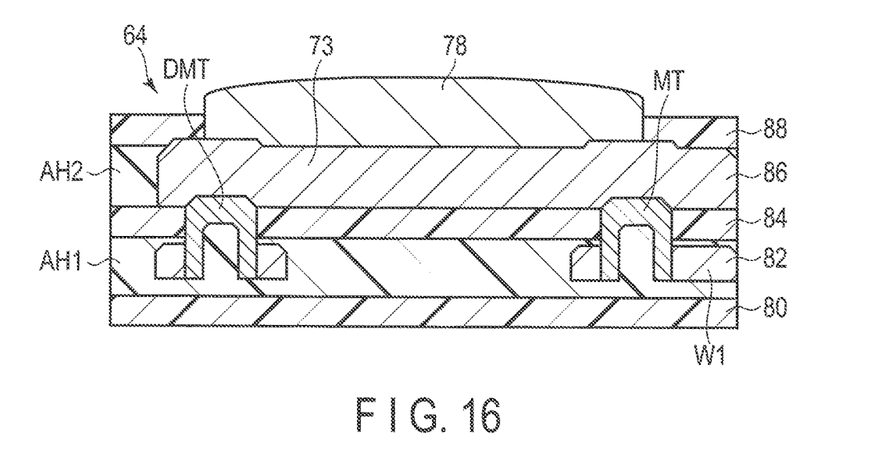
FIG. 16 is a cross-sectional view of the bonding portion taken along a line C-C in FIG. 15.

FIG. 15 is a plan view illustrating a bonding portion of a flexible printed wiring board used in an HDD according to a fifth embodiment in an enlarged view, and FIG. 16 is a cross-sectional view of the bonding portion along a line C-C in FIG. 15. In FIG. 15, a cover insulation layer and solder plating layers are omitted.

According to the fifth embodiment, an FPC bonding portion 64 further includes a plurality of second plating through holes (conductive vias) DMT. The second plating through holes DMT are provided in respective connection pads 73 at positions overlapping other ends opposite to ends where plating through holes MT are provided. That is, the plating through holes MT and the second plating through holes are provided at the positions overlapping the both ends of the respective connection pads 73. The second plating through holes DMT are dummy plating through holes, and thus are not connected to first wirings W1. In the fifth embodiment, other configurations of the FPC are identical to the FPC according to the fourth embodiment as aforementioned.

According to the fifth embodiment, as illustrated in FIG. 16, the vias are provided to overlap the both ends of the connection pads, by which bulges of solder plating layers 78 on the connection pads are further uniformized, and bonding force variation can further be reduced.

In the aforementioned second to fifth embodiments, other configurations of HDDs and the flexible wiring boards are identical to the HDD and the flexible wiring board according to the first embodiment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The magnetic disks are not limited to five, and may be four or less or six or more, and the number of the suspension assembly and the number of the magnetic heads may be increased or reduced according to an installed number of the magnetic disks. A number of the connection terminals at the connection ends of the suspension assemblies is not limited to thirteen, and may be increased or reduced as needed. Materials, shapes, sizes, and the like of elements configuring the disk device are not limited to the aforementioned embodiments, and may be changed in various ways as needed.

Further, in the present embodiments, the bonding portion 64 was mounted on a same plane as the head IC (head amplifier) 54, however, no limitation is made hereto and the bonding portion 64 may be of an angle solder scheme that arranges it perpendicularly intersecting the head IC (head amplifier) 54.

What is claimed is:

1. A disk device comprising:
a disk-shaped recording medium including a recording layer;
a magnetic head configured to process information on the recording medium; and
an actuator assembly supporting the magnetic head to be movable relative to the recording medium,
wherein the actuator assembly comprises a rotatable actuator block, a plurality of suspension assemblies extending from the actuator block and at least one of the suspension assemblies supporting the magnetic head, and a flexible printed wiring board mounted on the actuator block;
the flexible printed wiring board comprises:
a base insulation layer;
a plurality of first wirings on the base insulation layer;
an intermediate insulation layer overlapped with the first wirings and the base insulation layer;
a plurality of connection pads on the intermediate insulation layer;
a cover insulation layer overlapped with the connection pads and the intermediate insulation layer and including a plurality of openings through which the connection pads are exposed to the cover insulation layer; and
conductive vias electrically connecting the first wirings to at least a part of the connection pads respectively, the conductive vias being arranged to overlap with the connection pads in a thickness direction of the flexible printed wiring board.

2. The disk device of claim 1, wherein
at least one of the suspension assemblies comprises a wiring member connected to the magnetic head, and the wiring member comprises a connection end portion bonded to the connection pads of the flexible printed wiring board.

3. The disk device of claim 1, wherein each of the connection pads includes a predetermined width, the conductive vias are arranged to overlap with widthwise center portions of the connection pads, and the first wirings include one ends connected to the conductive vias, and the one ends are arranged to overlap with the connection pads in a thickness direction of the flexible printed wiring board.

4. The disk device of claim 3, wherein
the one ends of the first wirings extend in a width direction of the connection pads.

5. The disk device of claim 3, wherein
the one ends of the first wirings extend in a direction intersecting with a width direction of the connection pads.

6. The disk device of claim 1, wherein
each of the connection pads includes a predetermined width, and the conductive vias are arranged to overlap with one end portions in a widthwise direction of the connection pads.

7. The disk device of claim 6, wherein each of the connection pads includes the one end portion and other end portion opposite to the one end portion in the widthwise direction, and which further comprises second conductive vias arranged to overlap with the other end portions of the connection pads.

8. The disk device of claim 1, wherein the flexible printed wiring board comprises a plurality of connection pad groups on the intermediate insulation layer, each of which includes a plurality of connection pads arranged with an interval between each other, the connection pad groups are arranged with an interval between each other, and the first wirings are wired in a region between the connection pad groups.

9. The disk device of claim 8, wherein the flexible printed wiring board comprises a plurality of second wirings wired on the intermediate insulation layer in the region between the connection pad groups, and the second wirings are connected to a part of the connection pads.

* * * * *